2,505,976

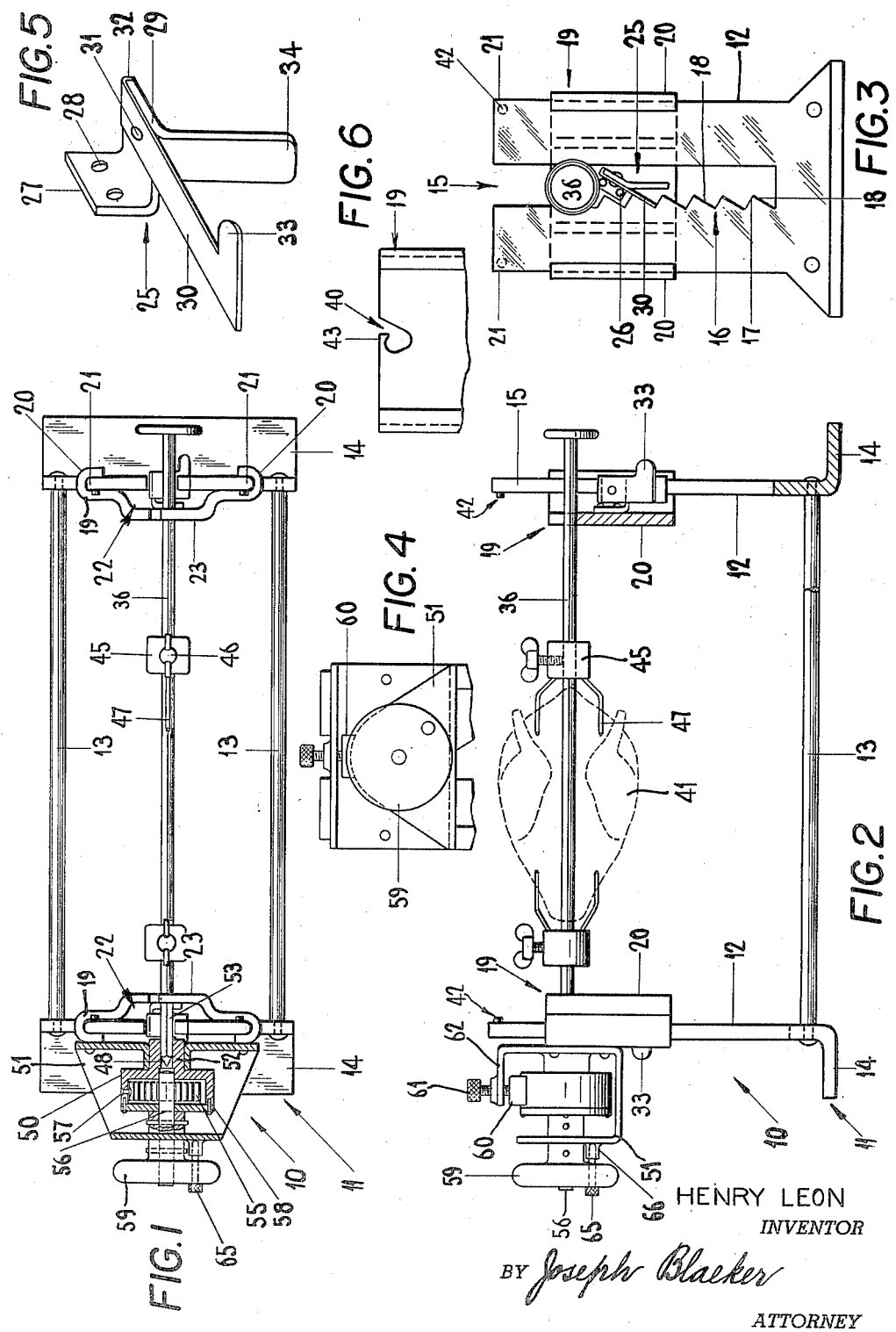
May 2, 1950     H. LEON     2,505,976
AUTOMATICALLY ROTATABLE BARBECUE
Filed May 3, 1947
HENRY LEON
INVENTOR
BY Joseph Blacker
ATTORNEY Patented May 2, 1950

UNITED STATES PATENT OFFICE 2,505,976

AUTOMATICALLY ROTATABLE BARBECUE

Henry Leon, Brooklyn, N. Y.

Application May 3, 1947, Serial No. 745,806

2 Claims. (Cl. 99—421)

This invention relates to a novel apparatus for roasting meats, fowls, etc., and for automatically rotating the meat or fowl during the process of roasting.

An object of this invention is to provide a device adapted to be placed on a stove, for roasting meat, the meat being turned automatically during the roasting operation, and the invention comprises an improved spit which carries the meat and novel means for mounting the spit.

Another object of this invention is to provide a roasting apparatus comprising means for vertically adjusting the spit in step-by-step selected positions with respect to the source of heat during the process of roasting and without removing the spit from a supporting frame or the source of heat.

Another object of this invention is to provide a portable coal-type, out-of-doors roasting apparatus designed for use by tourists, campers, and the like, for roasting meat, fowls, at picnics, etc.

Another object of this invention is to provide an automatically rotatable broiler or barbecue of the character described, comprising a frame having end walls and a spit extending longitudinally of the frame and supported in the end walls and having a rectangular end portion, a casing carried by one of the end walls and having a coil leaf spring operatively mounted therein and connected to a drive shaft for driving the shaft, the drive shaft being operatively in engagement with the rectangular end portion of the spit for rotating the spit.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the broiler.

Figure 2 is a side elevation of the broiler, partly in cross-section.

Figure 3 is an end view of the broiler, showing the spit.

Figure 4 is an end view of the broiler, showing spring actuating mechanism.

Figure 5 is a perspective view of a raising and lowering mechanism for the spit and the spring actuating mechanism.

Figure 6 is a view of a fragmentary portion of a slidable spit supporting frame showing opening means which permits raising or dropping the spit supporting frames.

In the illustrated embodiment of the invention, the numeral 10 indicates a portable broiler or barbecue for use by campers and comprising a main frame 11 having end walls 12 which are secured by riveted rods 13. The end walls 12 have horizontally positioned feet 14 adapted to rest on grate bars (not shown).

Each end wall 12 has a centrally positioned elongated upright slot 15. One face of each slot 15 is formed with a vertical row of ratchet teeth 16. Each tooth has a resting face or bottom wall 17 which is angularly directed below a horizontal plane. Each tooth also comprises an upwardly directed face 18 which is in right angular relation with the resting face 17. The teeth 16 start at the lower end of the slot 15, and terminate slightly below the upper end of the slot.

Vertically slidably mounted on the end walls 12 of the main frame 11 are spit supporting frames 19 having inturned upright sides 20 which are adapted to slidably engage the upright end faces 21 of the end walls 12.

Each supporting frame 19 is bent in a crosswise direction centrally thereof to provide an opening 22. The upright wall 23 defining the opening 22 carries a bracket 25 which is secured to the wall 23 by rivets 26. The bracket 25 comprises an upright portion 27 having openings 28 through which the rivets 26 pass. The bracket 25 also comprises an angularly directed extension 29. A leaf spring 30 is secured to the extension 29 by a rivet 31 and by bending one end portion 32 over the extension 29.

The free end of the spring 30 has a thumb-engaging portion 33 projecting sideways therefrom. The bracket 25 also has a downwardly directed portion 34 extending below the lower level of the thumb-engaging portion 33 and serving as a stop for engagement with the lower face of the slot 15.

It is to be noted that the openings 15 in the end walls 12 are open at the upper ends. This permits the user to readily remove or replace a spit 36 together with the fowl or meat roasted thereon from the rotisserie without changing the position of the frames 19 from their adjusted roasting position.

I have also provided opening means 40 in each spit supporting frame 19 to permit removal of the spit 36 and a fowl 41 from the roasting device 10 while the frames 19 are held on the walls 12 in set roasting position. The frames 19 are held against disengagement from the walls 12 by pins 42 in the upper ends of the walls.

It is to be noted that an upper extension or overhanging arm 43 in each frame 19 serves as grip means against which the spit 36 is held when it is desired to raise the frames 19 during adjustment of the spit and fowl from the feet 14 or from the source of heat.

The spit 36 includes a collar 45 slidably fitting on the spit and held in position by a screw 46. The collar 45 carries prongs 47 extending in a direction axially of the spit. One end 48 of the spit 36 is pointed so that this end can be forced through the article to be roasted.

A casing 50 of annular form is rotatably supported from a spit supporting frame 19 by a bracket 51 which is suitably fixed to the frame. The casing has a hub 52 at one side which is rotatably mounted in the bracket 51. The central portion of the hub 52 has an opening of square cross-section which is designed for engagement with an end portion 53 of the spit 36 which is also of square cross-section at one end.

A coiled leaf spring 55 is mounted in the casing 50 and has its inner end suitably connected to a shaft 56. The outer end of the spring 55 is connected to the peripheral portion of the casing by a rivet 57. The inner end of the shaft 56 is rotatably mounted in the hub 52. The outer portion of the shaft is rotatably mounted in a side plate 58 which is fixed to the casing 50.

A handwheel 59 is fixed to the outer end of the shaft 56 and is of a size to be grasped in the hand of the user for winding up the spring 55.

A brake shoe 60 is supported by a screw 61 threaded in an upper extension 62 of the bracket 51. The brake shoe is in frictional contact with the outer periphery of the casing and may be adjusted by the screw 61 to cause a regulated pressure against the casing 50 to pre-determine the rate of speed at which the wound spring 55 will rotate the spit 36 and the fowl 41. It is to be noted that the entire length of the spit, with the exception of the portion 53, has a circular cross-section to facilitate rotation.

A lock pin 65 passes through the handwheel 59 and has a reduced end designed to enter into engagement with a hollow boss 66 forming part of the bracket 51. When the user winds up the spring 55 he inserts the lock pin 65 into the handwheel and into the boss 66 and thus locks the casing 50 against rotation.

It is to be noted that by the term "stove" I mean to include any type of heating of a fowl, such as the fireplace of the grate bar type.

It is also to be noted that by "operatively in engagement" I means to imply that the shaft 56, through the intermediary of suitable mechanism causes rotation of the spit 36.

In accordance with the patent statutes I have described and illustrated the preferred embodiment of my invention, but it will be understood that various changes and modifications can be made therein without departing from the spirit of the invention as defined by the appended claims.

I claim:

1. In an automatically rotatable broiler or barbecue, comprising a main supporting frame and a spit and means to vertically adjust said spit in any selected position with respect to the source of heat and without removing the spit from the source of heat, said main supporting frame having end walls formed with vertical slots and vertically spaced ratchet teeth and horizontally positioned grill engaging feet, slidable frames mounted on said end walls, a spit extending through said vertical slots and longitudinally of said main supporting frame and being rotatably supported in said slidable frames, said slidable frames having openings inwardly of said main frame and having resilient pawls engageable with said ratchet teeth, said slidable frames being vertically adjustable for engagement with selected ratchet teeth to support said spit horizontally at predetermined heights from said feet, said spit having a rectangular end portion, a casing carried by one of said slidable frames, a coiled spring operatively mounted in said casing and connected to a drive shaft for driving said shaft, said drive shaft having means engageable with said spit for rotating said spit during vertical adjustments of said spit and without removing the spit from said supporting frame or from the source of heat.

2. In an automatically rotatable broiler or barbecue, comprising a main supporting frame and a spit and means to vertically adjust said spit in any selected position with respect to the source of heat and without removing the spit from the source of heat, said main supporting frame having end walls formed with vertical slots and vertically spaced ratchet teeth and horizontally positioned grill engaging feet, slidable frames mounted on said end walls, a spit extending through said vertical slots and longitudinally of said main supporting frame and being rotatably supported in said slidable frames, said slidable frames having openings inwardly of said main frame and having resilient pawls engageable with said ratchet teeth, said slidable frames being vertically adjustable for engagement with selected ratchet teeth to support said spit horizontally at predetermined heights from said feet, said spit having a rectangular end portion, a casing carried by one of said slidable frames, a coiled spring operatively mounted in said casing and connected to a drive shaft for driving said shaft, said drive shaft having means engageable with said spit for rotating said spit during vertical adjustments of said spit and without removing the spit from said supporting frame or from the source of heat, said slidable frames having overhanging arms serving as grip means for adjusting said spit from said feet.

HENRY LEON.

REFERENCES CITED

The following references are of record in the file of this patent:

UNITED STATES PATENTS

| Number | Name | Date |
|---|---|---|
| 1,051,502 | Klein | Jan. 28, 1913 |
| 2,388,831 | Cramer | Nov. 13, 1945 |